United States Patent [19]

Sebenik et al.

[11] 4,374,100

[45] Feb. 15, 1983

[54] RECOVERY AND RECYCLE OF MOLYBDENUM VALUES FROM COAL LIQUEFACTION RESIDUE

[75] Inventors: Roger F. Sebenik; Calvin J. Hallada; Henry F. Barry; George A. Tsigdinos, all of Ann Arbor, Mich.

[73] Assignee: Amax Inc., Greenwich, Conn.

[21] Appl. No.: 393,987

[22] Filed: Jun. 30, 1982

Related U.S. Application Data

[63] Continuation of Ser. No. 243,157, Mar. 18, 1981, abandoned.

[51] Int. Cl.$^3$ .................................... C01G 39/00
[52] U.S. Cl. .................................... 423/56; 423/58; 423/61; 208/10
[58] Field of Search .................. 423/55, 56, 58, 61

[56] References Cited

U.S. PATENT DOCUMENTS

| | | | |
|---|---|---|---|
| 2,079,805 | 5/1937 | Judd | 423/56 |
| 2,367,506 | 1/1945 | Kissock | 423/55 |
| 3,393,971 | 7/1968 | Vanderpool et al. | 423/55 |
| 3,622,301 | 11/1971 | Mehl et al. | 75/3 |
| 3,725,524 | 4/1973 | Martin et al. | 423/49 |
| 3,763,303 | 10/1973 | Khuri et al. | 423/54 |
| 3,773,890 | 11/1973 | Fox et al. | 423/58 |
| 3,829,550 | 8/1974 | Ronzio et al. | 423/54 |
| 3,848,049 | 11/1974 | Ronzio et al. | 423/54 |
| 4,075,277 | 2/1978 | Castagna et al. | 423/55 |
| 4,075,278 | 2/1978 | Cravey et al. | 423/55 |
| 4,079,116 | 3/1978 | Ronzio et al. | 423/56 |
| 4,087,510 | 5/1978 | Steenken | 423/53 |

FOREIGN PATENT DOCUMENTS

| | | | |
|---|---|---|---|
| 771568 | 11/1967 | Canada | 423/58 |
| 2631089 | 12/1978 | Fed. Rep. of Germany | 423/61 |
| 55-89437 | 7/1980 | Japan | 423/61 |

OTHER PUBLICATIONS

Marculetui et al., "Recovery of Molybdenum from Wastes and Natural Concentrates", in Gheorgh Gheorgiu-Dej Polytechnic Institute Bulletin (Bucharest), vol. XXIX, No. 2, pp. 43–48, (1976).

Primary Examiner—Herbert T. Carter
Attorney, Agent, or Firm—Michael A. Ciomek; Donald T. Black

[57] ABSTRACT

The residue from a Mo-catalyzed coal liquefaction process is treated to recover the Mo in a form in which the Mo can easily be recycled and reused as a catalyst for coal liquefaction. The process includes intimately mixing the residue with alkali in excess of the stoichiometric amount required for water-soluble molybdate formation, subjecting the mixture to an oxidative roast at about 600° C. to about 800° C. for up to about one hour, leaching the roasted product with water to extract Mo values into solution, and then carrying out a series of steps involving acidifying and ammoniating the solution to form a Mo-bearing precipitate which is recovered and dissolved in aqueous ammonium hydroxide to form a solution which can be applied to coal to catalyze coal liquefaction.

13 Claims, 2 Drawing Figures

RECOVERY AND RECYCLE OF MOLYBDENUM VALUES FROM COAL LIQUEFACTION RESIDUE

This is a continuation of application Ser. No. 243,157, filed Mar. 18, 1981, and now abandoned.

BACKGROUND OF THE INVENTION

1. Field of the Invention

This invention relates to molybdenum-catalyzed coal liquefaction processes, and in particular to the recovery of molybdenum from coal liquefaction residues to permit reuse of the molybdenum to catalyze additional coal liquefaction.

Current efforts to develop alternate energy sources to petroleum for fuels and hydrocarbon feedstocks have included investigation of processes for converting coal into a variety of products. One type of process is known as coal liquefaction. In coal liquefaction, coal is typically pulverized and treated with one or more catalysts, typically by spraying an aqueous solution, emulsion, or suspension of the catalytic agent onto the coal. The thus prepared coal is then reacted with hydrogen at temperatures of about 1000° F. and pressures of about 1000 psi to produce a mixture of hydrocarbon liquids and gases and a tarry carbonaceous residue containing the metallic component of the catalyst. The tarry residue is then gasified, that is, treated at elevated temperature and pressure to generate $H_2$ and CO and to recover additional BTU value from the tar as a gas stream, leaving an ash residue. The $H_2$ is then used in the coal hydrogenation reactor for liquefaction.

It is desirable to employ a molybdenum-based catalyst in coal liquefaction because, generally speaking, catalyzing the coal liquefaction reaction with molybdenum improves the quantity and quality of liquid fuel products recovered. That is, more of the liquid products of molybdenum-catalyzed coal hydrogenation can be used as transportation fuels, e.g., gasoline, jet fuel, or Diesel fuel, whereas most of the liquid products of coal hydrogenation carried out without molybdenum catalysts are generally limited to use as fuel for power plants.

The economic value of the molybdenum in such catalysts makes recovery of the molybdenum from the coal liquefaction residue highly desirable, so that the molybdenum is not discarded with the residue. The molybdenum should advantageously be recovered in a form which makes the valuable properties of the molybdenum readily available; more advantageously, the molybdenum should be recovered in a form which can be applied to coal to catalyze coal liquefaction in a continuous process.

Prior to the present invention, however, recovery of the molybdenum from a coal liquefaction residue has not been feasible. The ash residue produced in the gasifier stage mentioned above is initially molten, and solidifies on cooling into a glassy solid. The molybdenum is finely disseminated in metallic or reduced oxide form throughout the glassy matrix. Previously known processes for recovering molybdenum have not been directed to this type of molybdenum-bearing source material. Thus, there is a need for a process for recovering molybdenum from such residues, and especially for recovering the molybdenum in a form in which the molybdenum can be readily reused in the coal liquefaction process.

2. Description of the Prior Art

The desirability of recovering the molybdenum from spent catalysts is illustrated by U.S. Pat. No. 4,087,510, which discloses a process for recovering molybdenum and vanadium from a spent petroleum hydro-desulfurization catalyst. Hydro-desulfurization converts sulfur in high-sulfur petroleum fractions to hydrogen sulfide. The conversion is catalyzed by a catalyst typically comprising compounds of molybdenum and cobalt deposited on an aluminum oxide support. The spent catalyst comprises molybdenum disulfide deposited on the surfaces of the aluminum oxide support, which is also contaminated with vanadium and cobalt sulfides, hydrocarbon oil, and carbon. This material is quite different from the molybdenum-bearing coal liquefaction residue that is treated in the present invention, since the coal residue contains metallic or reduced oxide molybdenum entrapped within solid, glassy ash. Thus, the prior patented process is not directly pertinent to the process of the present invention.

According to U.S. Pat. No. 4,087,510, the spent hydro-desulfurization catalyst is mixed with solid alkali metal carbonate, and the mixture is heated in the presence of air to a temperature between about 650° C. and about 850° C. for one to two hours. The heated product is then leached with water to dissolve vanadium and molybdenum compounds. The patentee states that molybdate can be precipitated as ammonium tetramolybdate "by using hydrochloric acid at a pH of about 2.5", but there is no disclosure of processing steps to prepare the molybdenum for reuse in any catalytically effective form.

U.S. Pat. No. 4,075,277 and U.S. Pat. No. 4,075,278 relate to the recovery of molybdenum from spent catalysts comprising molybdenum and other metals on an alumina support. The spent catalyst is impregnated with an aqueous solution of sodium carbonate containing a stoichiometric excess of sodium carbonate of up to about 10%, and then roasted at 600° C. to 800° C. The roasted material is cooled and then leached in water to dissolve sodium molybdate. The leach liquor is treated with successive additions of nitric acid to precipitate molybdic acid. The latter patent concerns a modification of the process in which the spent catalyst is treated with $CO_2$ gas to prevent deposits from building up in the system. These patents describe the treatment of material which is significantly different from the coal liquefaction residue and do not produce an ammonium-polymolybdate product.

Several patents assigned to the assignee of the present application relate to the recovery of molybdenum as an ammonia-molybdenum compound, but do not suggest the process of the present invention. One, U.S. Pat. No. 3,763,303, discloses a process for extracting molybdenum values from spent catalysts, such as spent epoxidation catalysts, involving a series of extraction steps with e.g. potassium hydroxide or ammonium hydroxide, followed by acidification to precipitate "ammonium molybdenum compounds". Others, namely U.S. Pat. No. 3,829,550, U.S. Pat. No. 3,848,049, and U.S. Pat. No. 4,079,116, disclose leaching solid $MoO_3$ with aqueous ammonium hydroxide to form an aqueous solution containing dissolved ammonium-molybdate compounds. These four patents do not disclose the steps in the presently claimed invention for recovering an ammonium-polymolybdate precipitate from an alkali molybdate leach liquor, and they do not suggest the claimed process for treating coal liquefaction residues to recover molybdenum values in catalytically effective form.

BRIEF SUMMARY OF THE INVENTION

The present invention comprises a process for treating a solid, molybdenum-bearing coal liquefaction residue to recover molybdenum values therefrom, comprising (a) intimately mixing the residue with an amount of alkali equivalent to about 6 to about 10 times the stoichiometric amount required for conversion of the molybdenum in the residue to water-soluble molybdate, (b) roasting the mixture produced in step (a) under conditions which are oxidizing as to the molybdenum, to convert molybdenum in the residue to water-soluble molybdate, (c) leaching the roasted product of step (b) with water to form a leach liquor containing molybdenum values dissolved therein and having a pH value in excess of about 10.5, (d) then filtering the leach liquor from the leach residue, (e) lowering the pH value of the leach liquor to a value between about 6 and about 10.5 to precipitate impurities and a minor portion of the molybdenum values and to form a purified leach liquor, (f) separating the precipitate from the purified leach liquor, whereby the precipitate can be treated to remove impurities from the molybdenum values, (g) acidifying and ammoniating the purified leach liquor from step (f) to precipitate an ammonium-polymolybdate complex, and (h) recovering the ammonium-polymolybdate complex from the purified liquor.

Catalytically effective preparations useful in coal liquefaction can be prepared by dissolving the ammonium-polymolybdate complex recovered in step (h) in aqueous ammonium hydroxide, and by contacting the precipitate recovered in step (f) with an effective amount of aqueous ammonium hydroxide to dissolve molybdenum values from said precipitate, while minimizing dissolution of impurities from said precipitate, and then filtering undissolved solids from the resultant solution. The two molybdenum-bearing solutions thus formed can readily be applied to coal to provide an effective amount of molybdenum to act as a catalyst in the liquefaction of said coal.

DETAILED DESCRIPTION OF THE INVENTION

Figure 1:
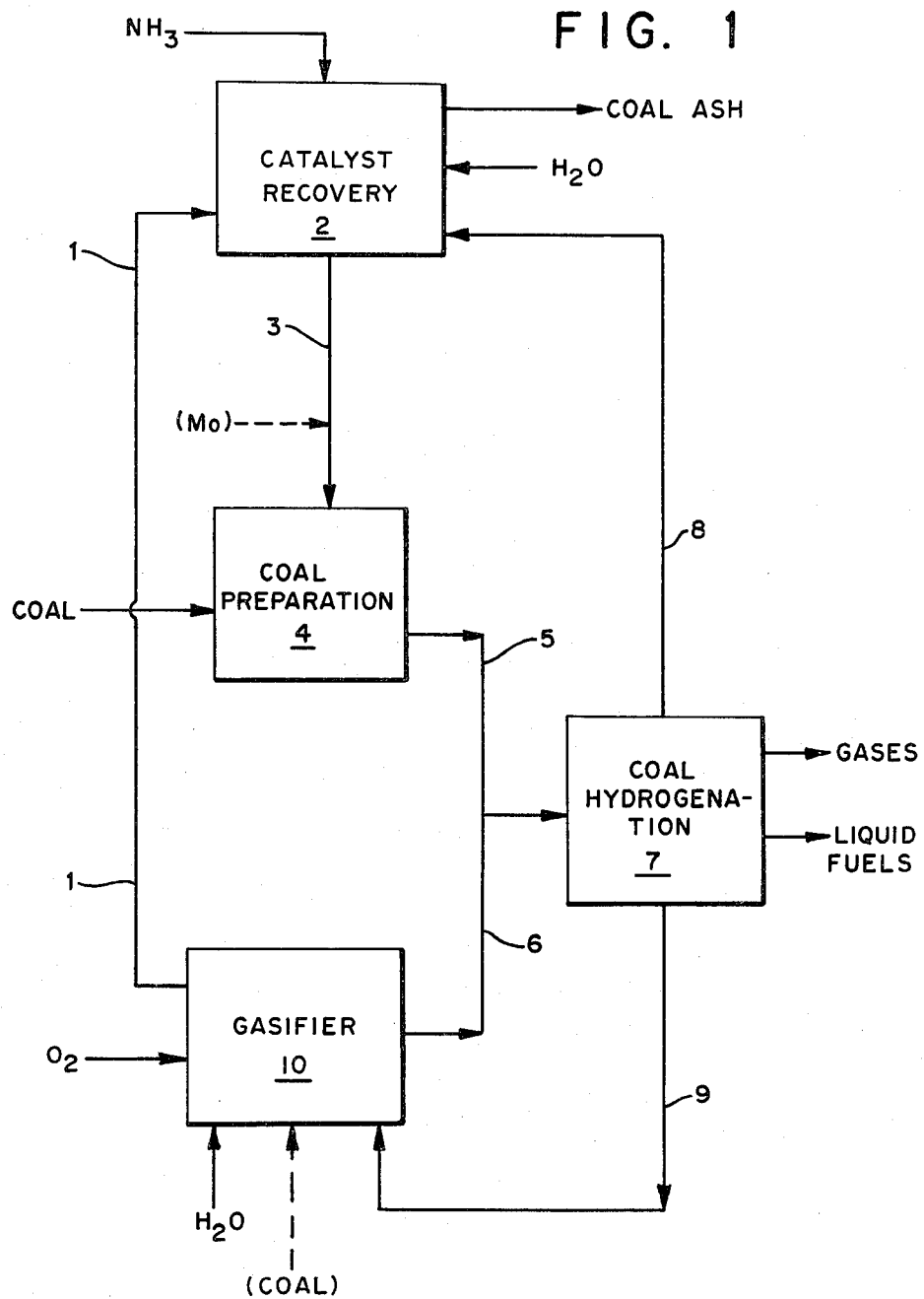
FIG. 1 is a flowsheet of a coal liquefaction process showing the relative location of the recovery step of the present invention.

As indicated, the process of the present invention is useful for recovering molybdenum from the residue of coal liquefaction, in a form which permits ready reuse of the molybdenum as a catalyst in the coal liquefaction process. Referring to FIG. 1, a stream 1 of residue from gasifier stage 10 (containing the spent molybdenum catalyst) is fed to catalyst recovery stage 2, along with ammonia and water for the purposes set forth more fully below. The molybdenum is recovered in stage 2 as stream 3, which comprises an aqueous solution of a complex ammonium-polymolybdate.

A makeup source of molybdenum, for instance ammonium dimolybdate (ADM), is also fed to stream 3 if needed to make up losses of molybdenum in the overall process. To initiate operation of the process described herein on a continuous basis, an aqueous solution of ammonium dimolybdate can be used as stream 3.

Coal is impregnated with stream 3 in stage 4, resulting in a stream 5 of catalyst-impregnated coal. Stream 5 is fed to stage 7, a coal hydrogenation reactor. Stream 6, which comprises a stream of gas composed mainly of carbon monoxide and hydrogen, is also fed to stage 7.

In stage 7, the catalyst-impregnated coal is reacted with hydrogen at temperatures of about 900° F. to about 1000° F. and at pressures of about 1000 psi to about 2000 psi to form a mixture of hydrocarbon gases and liquids as the desired products. The products of stage 7 include hydrocarbon gases, liquid fuels, and a solid, tarry, carbonaceous molybdenum-containing residue which constitutes stream 9. An aqueous by-product stream may be returned to the catalyst recovery stage as stream 8 to minimize the water requirements. Stream 9 is conveyed to gasifier stage 10, in which the tarry carbonaceous residues are gasified at high temperatures (e.g. about 2500° F.) and pressures (e.g. about 1300 psi) to effect a further conversion of the organic matter into useful gaseous compounds. The resultant gas stream 6 (after clean-up and CO shift conversion) is typically recycled to coal hydrogenation stage 7, although part or all of this stream may be diverted to other uses. Fresh coal can also be fed to stage 10 to maintain the energy and material balance of the system. Gasifier stage 10 also produces stream 1, comprising ash residue containing entrapped, finely divided, fully or partially reduced molybdenum, and traces of other impurities. Stream 1 is recycled to catalyst recovery stage 2 for recovery of the molybdenum in useful form from the residue.

The coal liquefaction residue that is treated in accordance with the process of the present invention thus comprises the molybdenum-impregnated solid residue that remains following hydrogenation of the coal and gasification of the solids produced in the hydrogenation stage. The molybdenum can be derived from decomposition of the catalytic preparation prepared in accordance with this invention, or from decomposition of other catalysts or reagents introduced in the coal liquefaction process. The coal liquefaction residue typically comprises a major proportion of aluminum silicates, carbon and high molecular weight carbon compounds, small amounts of impurities such as iron, calcium, titanium, sodium, and potassium, and about 0.1% to about 10% molybdenum by weight of the residue.

Figure 2:
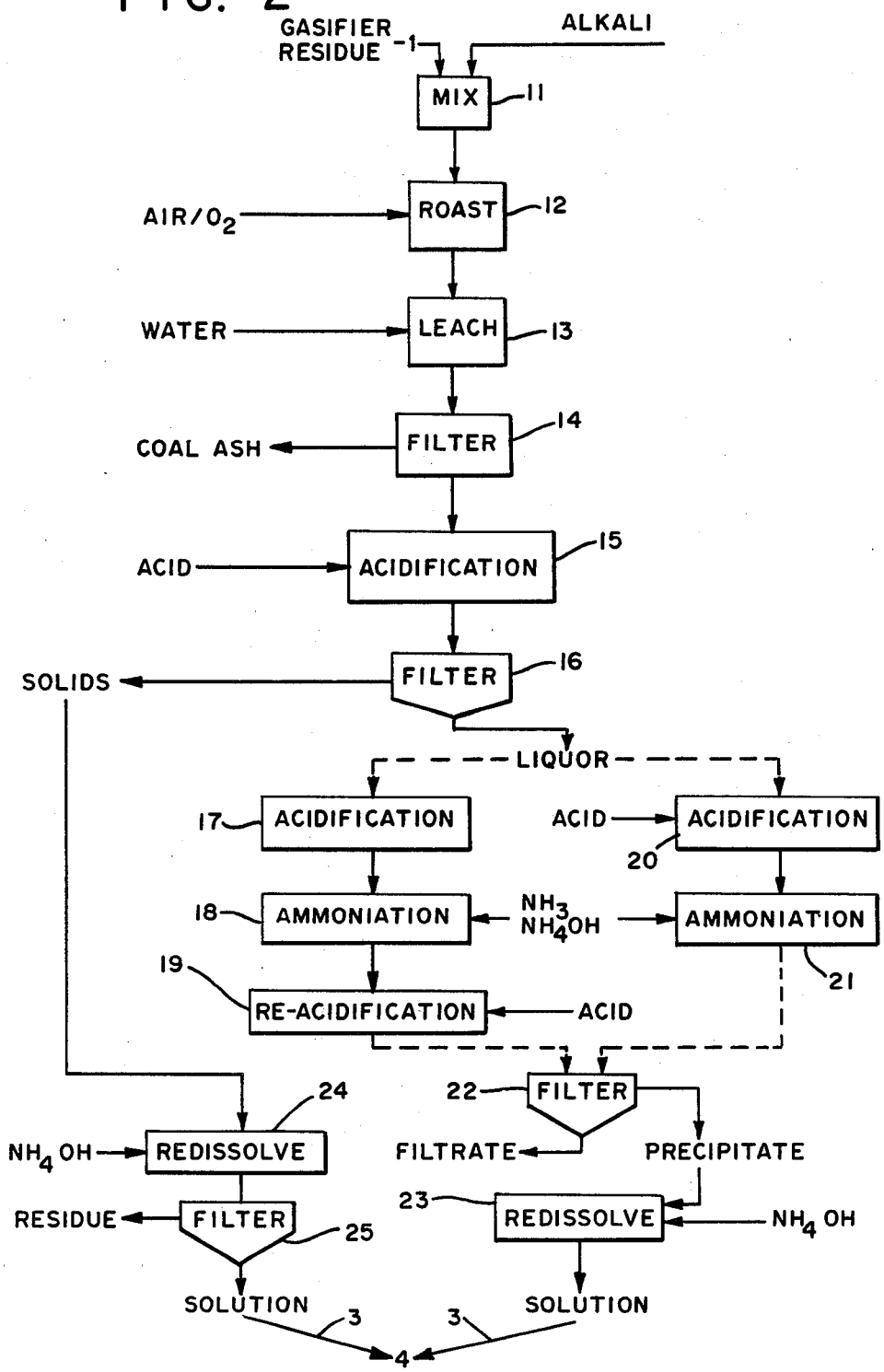
FIG. 2 is a flowsheet of the recovery process of the present invention.

The residue is treated in the present invention in a series of steps which are depicted in FIG. 2. The solid molybdenum-impregnated residue is intimately mixed with solid alkali in stage 11. By "alkali" is meant an oxide, hydroxide, or carbonate of an alkali metal and advantageously of sodium or potassium. Most preferred reagents are sodium oxide, sodium hydroxide, and sodium carbonate, as these reagents are relatively plentiful and inexpensive.

The residue and the alkali should be brought to a particle size, e.g. 100 mesh or finer, that permits intimate reactive contact between the reagents in the subsequent roasting step. The solid reagents are advantageously mixed by feeding the residue and the alkali to a mill such as a hammer mill, where the materials can be simultaneously pulverized and commingled. Alternatively, the residue can be milled and then slurried in an aqueous solution of the alkali reagent; this alternative provides satisfactory contact between the alkali and the residue, but requires increased energy input into the roasting step to evaporate water. If the residue is fed to this stage as an aqueous slurry, it is advantageous to centrifuge the slurry to lower its water content prior to feeding the residue to the hammer mill, to improve the efficiency of mixing and milling. The amount of alkali mixed with the residue should be equivalent to at least about 6 times, and advantageously about 6 to about 10 times, the stoichiometric amount required for conversion of the Mo in the residue to water-soluble molybdate form, such as $Na_2MoO_4$.

The mixture of residue and alkali is next subjected in stage 12 to a roast under conditions that are oxidizing as to the molybdenum, to convert the molybdenum in the residue to water-soluble molybdate. Roasting is advantageously carried out in the presence of air or oxygen, at a high enough temperature and for sufficient time to achieve essentially complete oxidation of the molybdenum. The roasting temperature and time should not be so high or prolonged that volatilization losses of molybdenum (e.g. as $MoO_3$) occur. Roasting temperatures of about 600° C. to about 800° C. and roasting times of up to about one hour, are generally advantageous. About 75% to about 95% or more of the Mo in the residue is converted to water-soluble molybdate.

The roasted material is cooled and then leached in water, in stage 13, to form a leach liquor having dissolved therein molybdenum values together with small amounts of impurities. Insoluble components of the roasted material are filtered from the leach liquor at stage 14 and discarded. The leach liquor contains a least about 75%, and advantageously at least about 95%, of the Mo that had been entrapped in the residue. The pH of the leach liquor is generally above about 10.5.

In an advantageous embodiment of the invention, the molybdenum-bearing liquor is boiled to increase the concentration of molybdenum in the liquor. Concentrating the molybdenum increases the recovery of molybdenum in the final precipitation step (stages 19 or 21 described below); the residual concentration of molybdenum remaining in solution after that step is essentially independent of the concentration of molybdenum in the liquor, so the amount of molybdenum which is not recovered in the precipitated product increases as the volume of the liquor increases. Accordingly, the amount of molybdenum that is precipitated from the liquor increases with increasing concentration of molybdenum in the liquor. One can boil the liquor to good effect at any point after leaching stage 13. If the liquor is boiled prior to stage 15, the volume of the equipment required in subsequent treatment stages can be reduced; but the recovery of the desired product can be increased even by boiling the liquor in stages 19 or 21, where the product is precipitated from the liquor.

The leach liquor is next treated, in stage 15, to lower the pH of the liquor sufficiently to form a precipitate which contains impurities and a minor portion of the molybdenum values. This precipitate is filtered from the leach liquor, in stage 16, and saved. It can be treated to separate impurities from the molybdenum values and thereby upgrade the molybdenum values, for instance in stages 24 and 25 discussed below.

In stage 15, the pH of the leach liquor is lowered by adding acid to the liquor. The value to which the pH of the liquor is lowered varies with the composition of the residue and with the acid used to form the precipitate. Generally speaking, the pH of the liquor is adjusted to a value of about 6 to about 10.5, dependent upon the acid which is used. Acidification can typically be carried out by adding sufficient sulfuric acid to adjust the pH of the liquor to a value between about 9 and about 10.5. Nitric acid can be used instead, in which case the pH of the liquor is typically brought to a value between about 6 and about 7. Lowering the pH precipitates solid material from the leach liquor. The precipitate contains considerable impurities, and a minor portion of the molybdenum values from the leach liquor. The liquor is then filtered in stage 16 to separate the precipitate and recover a purified leach liquor.

The filtered purified leach liquor from stage 16 is next acidified and ammoniated to precipitate therefrom a solid ammonium polymolybdate complex which can be filtered from the liquor and then redissolved in fresh aqueous ammonium hydroxide. A solution can thereby be provided that can be readily applied to coal to supply catalytically effective amounts of molybdenum.

Two embodiments of the treatment of the filtered purified leach liquor are depicted in FIG. 2 and described herein. In one, appearing as steps 17 through 19 in FIG. 2, the liquor from stage 16 is acidified in stage 17 with sufficient acid so that, on subsequent ammoniation of the liquor, a molar ratio of $NH_3$:Mo of about 1:1 to about 2.5:1 can be established in solution in the liquor. In stage 17, the pH value of the leach liquor should be lowered enough to permit the desired quantity of ammonia to be dissolved in the liquor. Thus, the pH value should be below about 4, but a pH value of about 1 to about 2.5 is generally satisfactory. Acidification can be carried out by the addition of a suitable amount of sulfuric acid or nitric acid. Following acidification in stage 17, the leach liquor is ammoniated in stage 18 to establish in solution in the leach liquor a molar ratio of $NH_3$:Mo of about 1:1 to about 2.5:1, and advantageously about 2:1. The leach liquor can be ammoniated by suitable additions of $NH_3$ or $NH_4OH$.

Following ammoniation of the leach liquor, the leach liquor is re-acidified in stage 19, to precipitate an ammonium-polymolybdate complex. As in the previous acidification stages, sulfuric acid or nitric acid can be used. The precipitation occurs more rapidly and with higher yield at temperatures above room temperature, i.e. at about 60° C. up to the boiling point of the liquor. The pH of the liquor reaches a pH value of about 0.5 to about 3.0.

As an alternative of steps 17 through 19, and again referring to FIG. 2, the filtered purified leach liquor from stage 16 can be acidified in stage 20 to a pH lower than that reached in acidification stage 17. Specifically, in stage 20 the pH value of the liquor is lowered to a point such that on subsequent ammoniation of the liquor in stage 21 an ammonium-polymolybdate complex precipitates as the ammoniating agent is added and without further acidification of the liquor. For this purpose, in stage 20 the liquor should be acidified to lower the pH value to about 1, or lower. Sulfuric acid or nitric acid can be used for the acidification. The acidified liquor from stage 20 is then ammoniated, in stage 21, by suitable additions of $NH_3$ or $NH_4OH$. Ammoniation causes the desired ammonium-polymolybdate complex to precipitate without need for re-acidification of the liquor.

It will be clear that the further acidification and ammoniation described above to achieve the conditions of pH and NH₃ to Mo ratio achieved in stage 19 and stage 21 can also be achieved by the addition of the appropriate ammonium salts of sulfuric, nitric, or other acids, and by the addition of combinations of such salts with NH₃ or NH₄OH, and with HNO₃ or H₂SO₄.

The ammonium-polymolybdate complex which precipitates from the liquor in step 19 or step 21 is recovered by filtration from the liquor in stage 22. The precipitate is believed to comprise a complex of one or more condensed ammonium polymolybdates. It contains at least about 75% and advantageously at least about 95% of the Mo fed in the untreated residue to stage 11. The precipitate can be treated by a variety of known methods (such as reduction or roasting) to recover the molybdenum as Mo metal or as MoO₃. The filtrate will typically contain less than about 1 gpl Mo.

Significantly, the ammonium-polymolybdate complex is characterized in that it can be rapidly and easily precipitated from the leach liquor as described heretofore, yet goes readily and completely into solution in fresh excess aqueous ammonium hydroxide. In addition, the ammonium-polymolybdate complex contains at most only relatively insignificant amounts of impurities. These properties are a significant feature of the present invention, for they permit continuous recycling of molybdenum from coal liquefaction residues into a form suitable to permit the molybdenum to be re-impregnated onto coal in catalytically effective amounts.

Thus, still referring to FIG. 2, a catalyst preparation suitable for use in coal liquefaction can be prepared from the precipitated ammonium-polymolybdate complex recovered from stage 22 as described herein, by dissolving the complex in aqueous ammonium hydroxide in stage 23. Advantageously, the relative amounts of NH₄OH and the ammonium-polymolybdate complex are chosen to provide a solution containing molybdenum in a concentration such that the solution can be easily applied to coal, providing a catalytically effective amount of molybdenum, while avoiding the application of excess amounts of liquid or of molybdenum to the coal. The solution should thus contain about 5% to about 15% Mo by weight, and have a molar ratio of NH₃:Mo dissolved therein of about 1:1 to about 3:1.

The overall recovery of molybdenum in the process of the present invention is further enhanced by recovering and recycling molybdenum from the solid precipitate that is recovered at stage 16. Referring again to FIG. 2, the precipitate from stage 16 is contacted at stage 24 with an effective amount of aqueous ammonium hydroxide to dissolve the molybdenum values from the precipitate. Advantageously, the amount of ammonium hydroxide is chosen to maximize dissolution of molybdenum values while minimizing dissolution of the associated impurities. The resultant solution should contain about 5% to about 15% Mo by weight, and should have a molar ratio of NH₃:Mo of about 1:1 to about 3:1. This solution is filtered at stage 25 to remove undissolved solids. The solution can be treated by known techniques (e.g. crystallization, evaporation, or roasting) to recover the molybdenum values contained therein, as for example MoO₃ or Mo metal.

The solutions recovered in stages 23 and 25 can advantageously be conveyed, separately or mixed together, as stream 3 to coal impregnation stage 4 (see FIG. 1). In stage 4 the molybdate solutions can be diluted, if necessary, and sprayed or otherwise applied to coal in catalytically effective amounts before the coal is fed to the hydrogenation reactor. It should be understood that the molybdenum catalyzes the coal liquefaction in the sense that the hydrocarbon reaction products are higher in grade than the reaction products that are produced by liquefaction of coal in the absence of catalytically effective amounts of molybdenum.

The invention is further described in the following examples which should be understood to be illustrative and non-limiting.

EXAMPLE 1

A simulated Mo-impregnated coal liquefaction residue was prepared by physically mixing Mo metal powder with coal ash from the gasifier stage of an actual coal liquefaction plant. The Mo was a −325 mesh powder, and the coal ash had been hammer milled to a fine powder. The mixture was placed in an iron boat and then heated in a furnace under hydrogen to 1300° C. The mixture softened, and the ash particles fused together and encapsulated the Mo particles in a dense mass. Scanning electron micrographs of this mass showed that the Mo was uniformly distributed in the ash. The ash contained 7.75% Mo by weight.

The Mo-ash mixture was then ground and screened to −325 mesh, and mixed with sufficient NaOH (−100 mesh) to provide 10 times the stoichiometric amount of NaOH required to convert the Mo to Na₂MoO₄. This mixture was then roasted at 700° C. under oxygen for one hour. The roasted product was leached in boiling water for one hour. Unleached solids were filtered from the leach liquor and washed; the wash liquor was then added to the leach liquor. The combined solutions were boiled down to produce a 100–110 gpl Mo solution. In duplicate tests the extraction of Mo from the Mo-ash mixture into the leach liquor was 92% and 96% respectively.

EXAMPLE 2

An aqueous Mo-bearing leach liquor prepared in accordance with Example 1, containing 105 gpl Mo and 545 gpl Na and having a temperature of 80° C. and a pH of 12.0, was acidified with nitric acid that had been prepared by diluting stock concentrated nitric acid 1:1 by volume. When the liquor pH reached 6.0, a precipitate ("Precipitate A") formed which was filtered from the liquor. Precipitate A contained about 4.3% Mo which accounted for 7.4% of the Mo in the aqueous leach liquor.

The liquor was further acidified with the 1:1 nitric acid to a pH of about 1.0, at which point enough NH₄OH was added to provide a NH₃:Mo molar ratio of 2:1 in solution in the liquor. The liquor was then acidified with the 1:1 nitric acid until a precipitate ("Precipitate B") formed, at a pH of about 1.0. The slurry of Precipitate B in the liquor was stirred for 60 minutes, following which Precipitate B was filtered, dried at 70° C. and analyzed. The Mo in Precipitate B corresponded to a Mo recovery from the aqueous leach liquor of 90.6%, so that the total recovery of Mo from the leach liquor in Precipitates A and B was 98%.

EXAMPLE 3

An aqueous molybdenum-bearing leach liquor prepared in accordance with Example 1, containing 105 gpl Mo and 545 gpl Na and having a temperature of 80° C. and a pH of 12.0, was acidified with sulfuric acid that had been prepared by diluting stock concentrated sulfuric acid to 20% by volume. When the liquor pH reached 9.8, a precipitate ("Precipitate A") formed which was filtered from the liquor. Precipitate A contained about 8.4% Mo which represents about 29.7% of the total Mo in the feed liquor.

The liquor was further acidified with the 20% sulfuric acid to a pH of about 1.0, at which point enough $NH_4OH$ was added to provide a $NH_3$:Mo molar ratio of 2:1 in solution in the liquor. The liquor was then acidified with the 20% sulfuric acid until a precipitate ("Precipitate B") formed, at a pH of about 2.0. The slurry of Precipitate B in the liquor was stirred for 120 minutes, following which Precipitate B was filtered, dried at 70° C., and analyzed. The Mo in Precipitate B corresponded to a Mo recovery from the aqueous leach liquor of 48.3%. Thus, the overall Mo recovery from the leach liquor in Precipitates A and B was 78%.

What is claimed is:

1. A process for treating a solid, glassy coal liquefaction residue containing molybdenum values entrapped therein, to recover molybdenum values therefrom, comprising
   (a) intimately mixing the residue with an amount of alkali equivalent to about 6 to about 10 times the stoichiometric amount required for conversion of the molybdenum in the residue to water-soluble molybdate,
   (b) roasting the mixture produced in step (a) under conditions which are oxidizing as to the molybdenum, to convert molybdenum in the residue to water-soluble molybdate,
   (c) leaching the roasted product of step (b) with water to form a leach liquor containing molybdenum values dissolved therein and having a pH value above about 10.5,
   (d) then filtering the leach liquor from the leach residue,
   (e) lowering the pH value of the filtered leach liquor to a value between about 6 and about 10.5 to precipitate impurities and a minor portion of the molybdenum values, and to form a purified leach liquor,
   (f) separating the precipitate from the purified leach liquor, whereby the precipitate can be treated to separate impurities from the molybdenum values,
   (g) acidifying and then ammoniating the purified leach liquor from step (f) to precipitate an ammonium-polymolybdate complex, and
   (h) recovering said ammonium-polymolybdate complex from the purified leach liquor.

2. The process of claim 1 wherein step (g) comprises the steps of
   acidifying the purified leach liquor to permit sufficient ammonia to be dissolved in the liquor to establish a molar ratio of $NH_3$ to Mo in the liquor of about 1:1 to about 2.5:1,
   ammoniating the acidified liquor to establish a molar ratio of $NH_3$ to Mo in the liquor of about 1:1 to about 2.5:1, and
   re-acidifying the ammoniated liquor to precipitate an ammonium-polymolybdate complex from the liquor.

3. The process of claim 1 wherein step (g) comprises the steps of
   acidifying the purified leach liquor to a degree such that subsequent ammoniation thereof precipitates an ammonium-polymolybdate complex from the liquor without subsequent re-acidification of the liquor, and
   ammoniating the acidified liquor to precipitate an ammonium-polymolybdate complex therefrom.

4. The process of claim 1, 2, or 3, further comprising contacting the precipitate obtained in step (f) with an effective amount of aqueous ammonium hydroxide to dissolve molybdenum values from said precipitate while minimizing dissolution of impurities from said precipitate, and filtering undissolved solids from the resultant solution.

5. The process of claim 1, 2, or 3, wherein step (c), (e), or (g) further comprises boiling the liquor in that step to increase the concentration of molybdenum in the liquor.

6. The process of claim 1, 2, or 3, wherein roasting in step (b) is carried out at about 600° C. to about 800° C. for up to about one hour.

7. The process of claim 1, 2, or 3 wherein step (e) comprises adding sufficient sulfuric acid to the leach liquor to lower the pH value of the liquor to between about 9 and about 10.5.

8. The process of claim 1, 2, or 3 wherein step (e) comprises adding sufficient nitric acid to the leach liquor to lower the pH value of the liquor to between about 6 and about 7.

9. A process for treating a solid, glassy coal liquefaction residue containing molybdenum values entrapped therein, to form a catalyst useful in coal liquefaction, comprising
   treating the residue in accordance with claim 1, 2, or 3, and further comprising
   (i) dissolving the precipitate recovered in step (h) in aqueous ammonium hydroxide, and
   (j) contacting the precipitate obtained in step (f) with an effective amount of aqueous ammonium hydroxide to dissolve molybdenum values from said precipitate while minimizing dissolution of impurities from said precipitate, and filtering undissolved solids from the resultant solution,
   whereby coal can readily be impregnated with the solution formed in either or both of steps (i) and (j) to provide an effective amount of molybdenum to act as a catalyst in the liquefaction of said coal.

10. The process of claim 9, wherein step (c), (e), or (g) further comprises boiling the liquor in that step to increase the concentration of molybdenum in the liquor.

11. The process of claim 9, wherein roasting in step (b) is carried out at about 600° C. to about 800° C. for up to about one hour.

12. The process of claim 9 wherein step (e) comprises adding sufficient sulfuric acid to the leach liquor to lower the pH value of the liquor to between about 9 and about 10.5.

13. The process of claim 9 wherein step (e) comprises adding sufficient nitric acid to the leach liquor to lower the pH value of the liquor to between about 6 and about 7.

* * * * *